United States Patent
Tahir et al.

(10) Patent No.: US 11,295,314 B2
(45) Date of Patent: Apr. 5, 2022

(54) AUTOMOTIVE RECALL SYSTEM AND METHOD

(71) Applicant: Acxiom LLC, Conway, AR (US)

(72) Inventors: Ahmed Kamal Tahir, Algonquin, IL (US); Gautam Ghosh, Windsor (CA); Jacob Reed, Portland, OR (US); Joseph Alan Forrester, Katy, TX (US); Michael R. Spadafore, Lake Orion, MI (US); Danielle Alsup, Clio, MI (US)

(73) Assignee: Acxiom LLC, Conway, AR (US)

( * ) Notice: Subject to any disclaimer, the term of this patent is extended or adjusted under 35 U.S.C. 154(b) by 86 days.

(21) Appl. No.: 16/827,185

(22) Filed: Mar. 23, 2020

(65) Prior Publication Data
US 2020/0286099 A1 Sep. 10, 2020

Related U.S. Application Data

(62) Division of application No. 15/238,579, filed on Aug. 16, 2016, now abandoned.
(Continued)

(51) Int. Cl.
*G06Q 30/00* (2012.01)
*G06Q 10/00* (2012.01)
(Continued)

(52) U.S. Cl.
CPC ..... *G06Q 30/014* (2013.01); *G06Q 10/06393* (2013.01); *G06Q 10/20* (2013.01);
(Continued)

(58) Field of Classification Search
CPC .... G06Q 30/014; G06Q 30/018; G06Q 10/20; G06Q 10/06393; G06Q 30/0203; G06Q 50/01; G06Q 30/0277; Y02P 90/80
(Continued)

(56) References Cited

U.S. PATENT DOCUMENTS 9,076,276 B1 * 7/2015 Kator ............... G07C 5/008
2007/0129064 A1 * 6/2007 Batchik ............ H04W 4/44
455/414.1

(Continued)

FOREIGN PATENT DOCUMENTS

WO WO-03030505 A2 * 4/2003 ........ H04M 3/42306
WO WO-2007079418 A2 * 7/2007 ............ G06Q 30/02
WO WO-2007079420 A2 * 7/2007 ............ G07C 5/008

OTHER PUBLICATIONS

M. Pecht, A. Ramakrishnan, J. Fazio and C. E. Nash, "The role of the U.S National Highway Traffic Safety Administration in automotive electronics reliability and safety assessment," in IEEE Transactions on Components and Packaging Technologies, vol. 28, No. 3, pp. 571-580, Sep. 2005 (Year: 2005).*

*Primary Examiner* — Rutao Wu
*Assistant Examiner* — Tyrone E Singletary

(57) ABSTRACT

A system and method for management of automobile recalls functions through a unified recall campaign user interface (UI) web-accessible to an original equipment manufacturer (OEM). The system utilizes both first-party (OEM) data and state registration data to identify vehicle owners by vehicle identification number (VIN). Enhancement data is used to provide contact information, whereby vehicle owners may be contacted concerning a recall repair through multiple channels. The system utilizes feedback during a recall and from previous recalls, as well as segmentation of vehicle owners by behavioral and attitudinal parameters, to optimize the channel(s) and message(s) used in order to maximize recall response. The system further utilizes various feeds of information concerning the recall to optimize recall repair parts distribution among dealers and dealer workforce utilization.

17 Claims, 10 Drawing Sheets

Related U.S. Application Data

(60) Provisional application No. 62/205,896, filed on Aug. 17, 2015.

(51) Int. Cl.
*G06Q 10/06* (2012.01)
*G06Q 30/02* (2012.01)
*G06Q 50/00* (2012.01)

(52) U.S. Cl.
CPC ....... *G06Q 30/018* (2013.01); *G06Q 30/0203* (2013.01); *G06Q 30/0277* (2013.01); *G06Q 50/01* (2013.01); *Y02P 90/80* (2015.11)

(58) Field of Classification Search
USPC ....................................................... 705/7.32
See application file for complete search history.

(56) References Cited

U.S. PATENT DOCUMENTS

| | | | |
|---|---|---|---|
| 2012/0185399 A1* | 7/2012 | Draper | G06Q 10/08 705/303 |
| 2013/0036061 A1* | 2/2013 | Alexander | G06Q 30/014 705/303 |
| 2014/0040434 A1* | 2/2014 | Rybak | G07C 5/008 709/219 |
| 2014/0089006 A1* | 3/2014 | Abreu | G16H 40/67 705/3 |
| 2015/0012294 A1* | 1/2015 | Casady | G16H 40/20 705/2 |
| 2015/0081565 A1* | 3/2015 | Roullier | G06Q 30/0242 705/64 |
| 2015/0286994 A1* | 10/2015 | Elder | G06Q 10/20 705/305 |

* cited by examiner

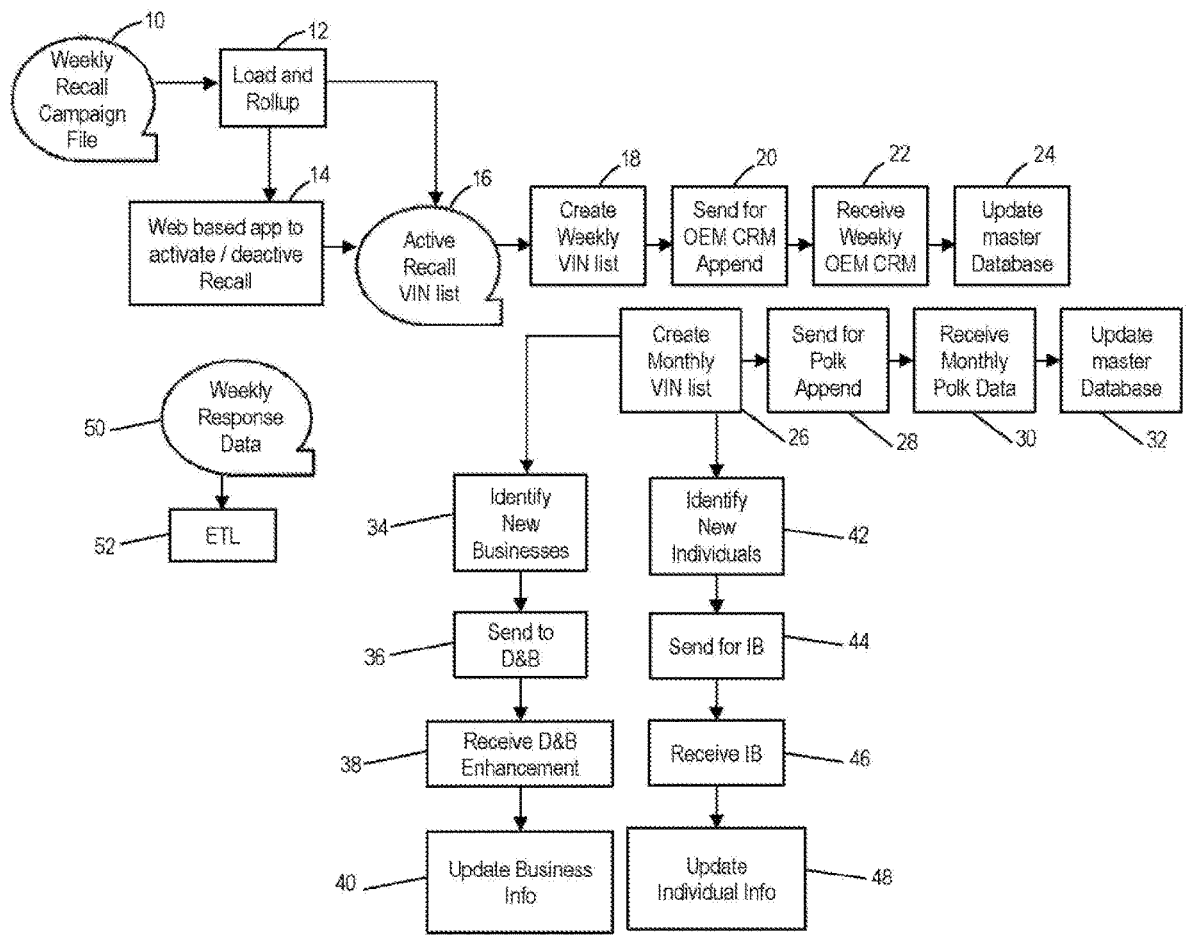
Fig. 1.1

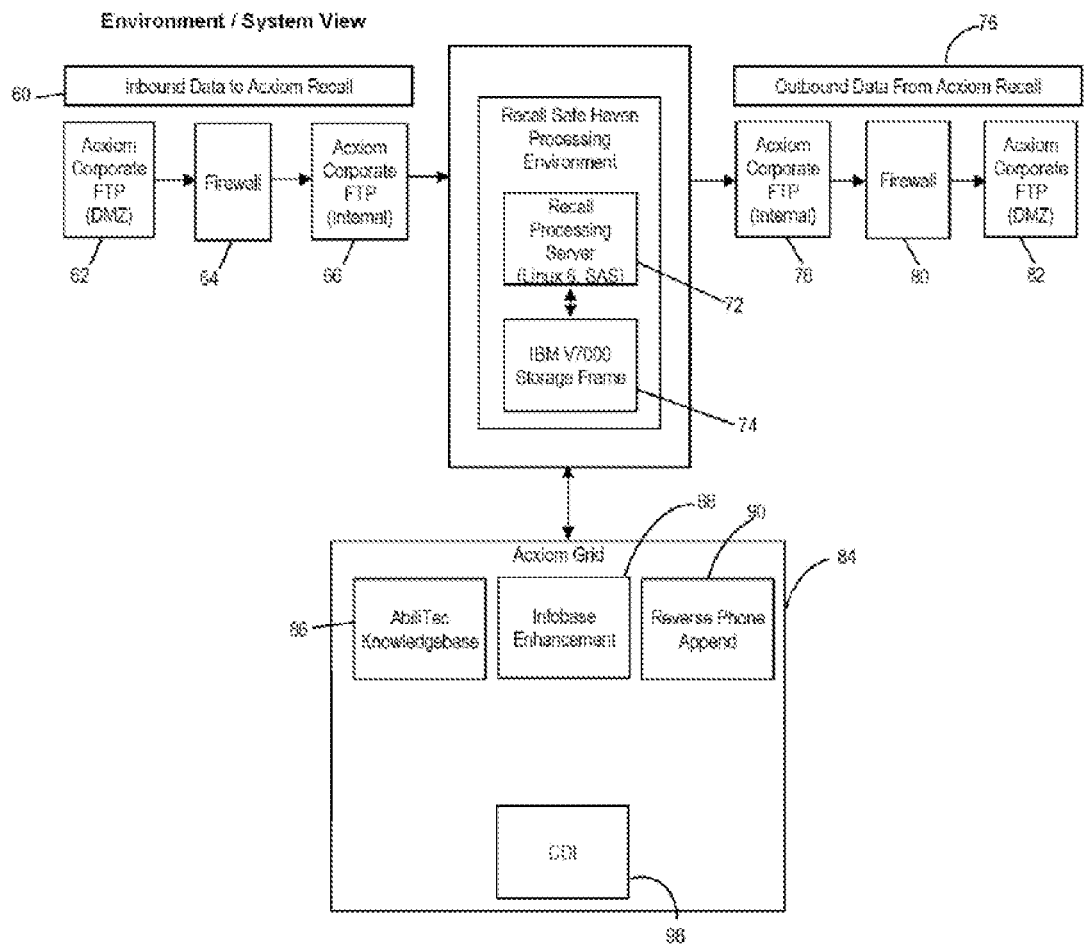
Fig. 1.2
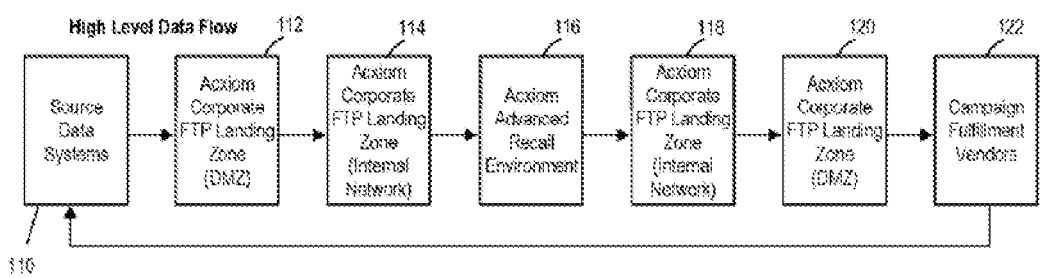
Fig. 2.1

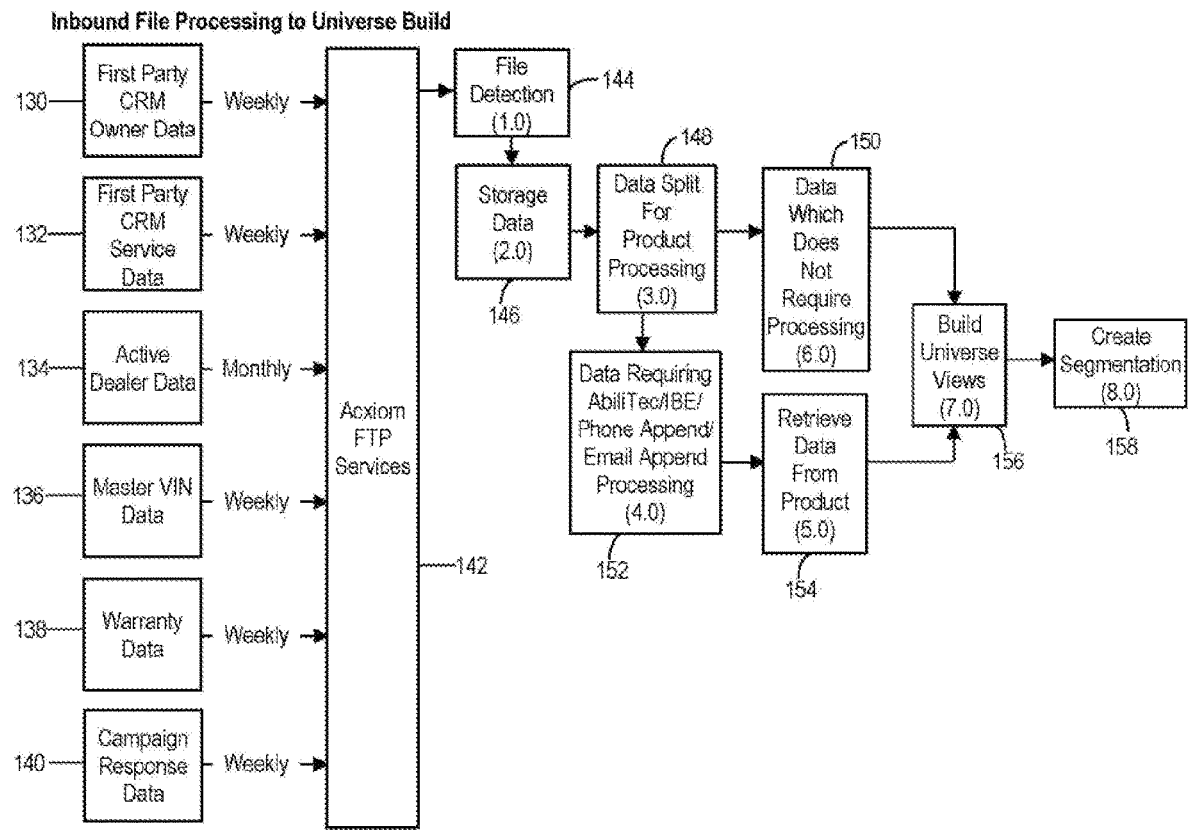
Fig. 2.2

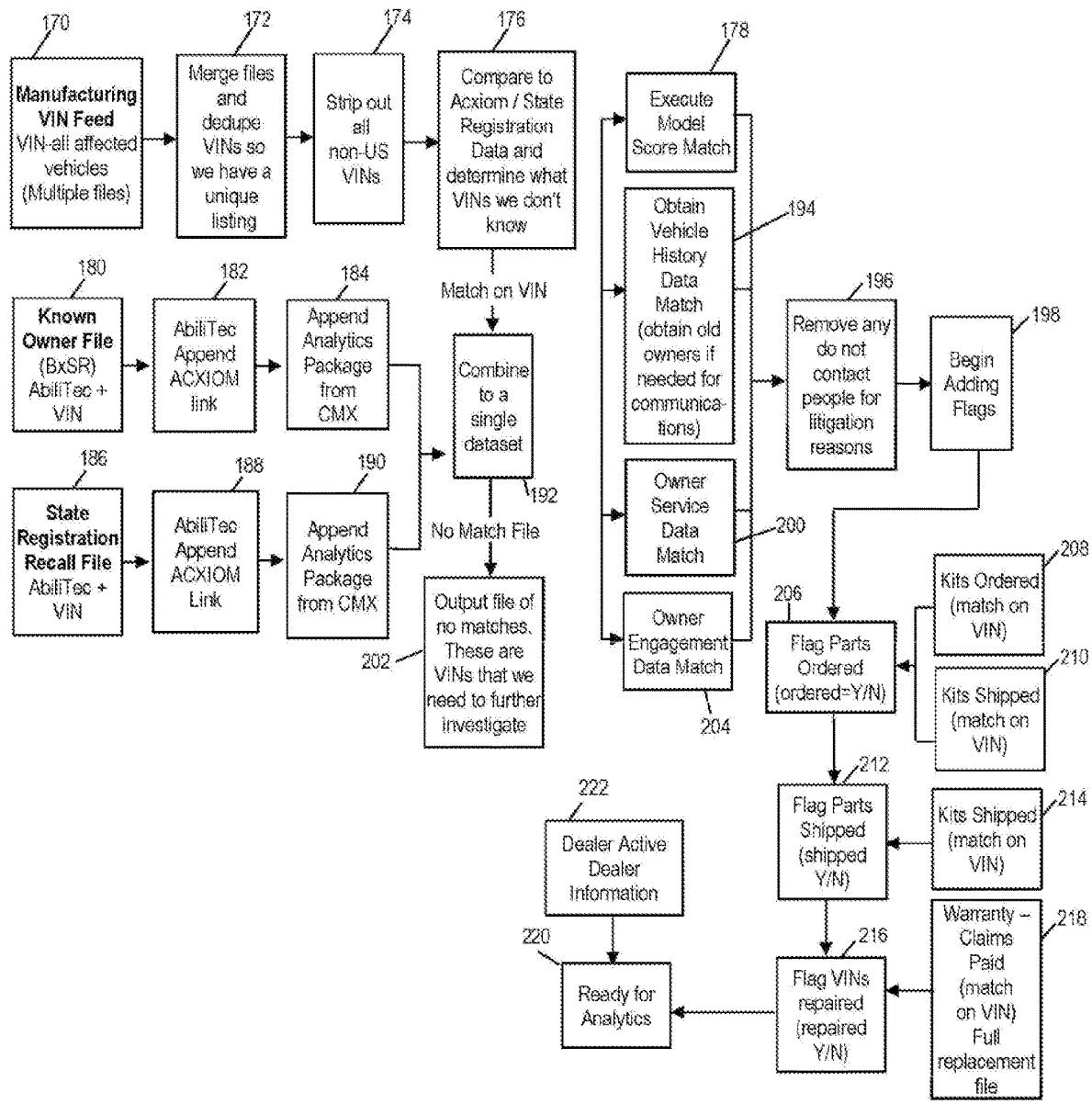
Fig. 2.3

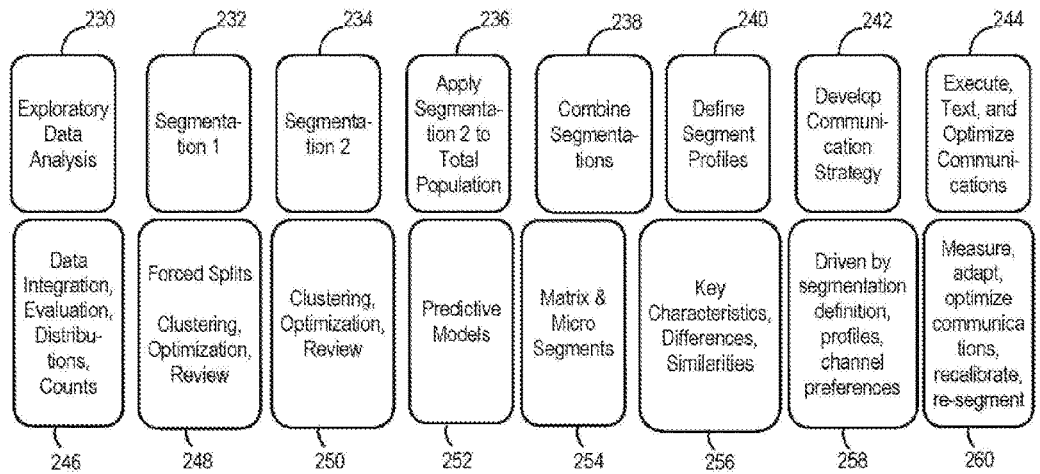
Fig. 3.1
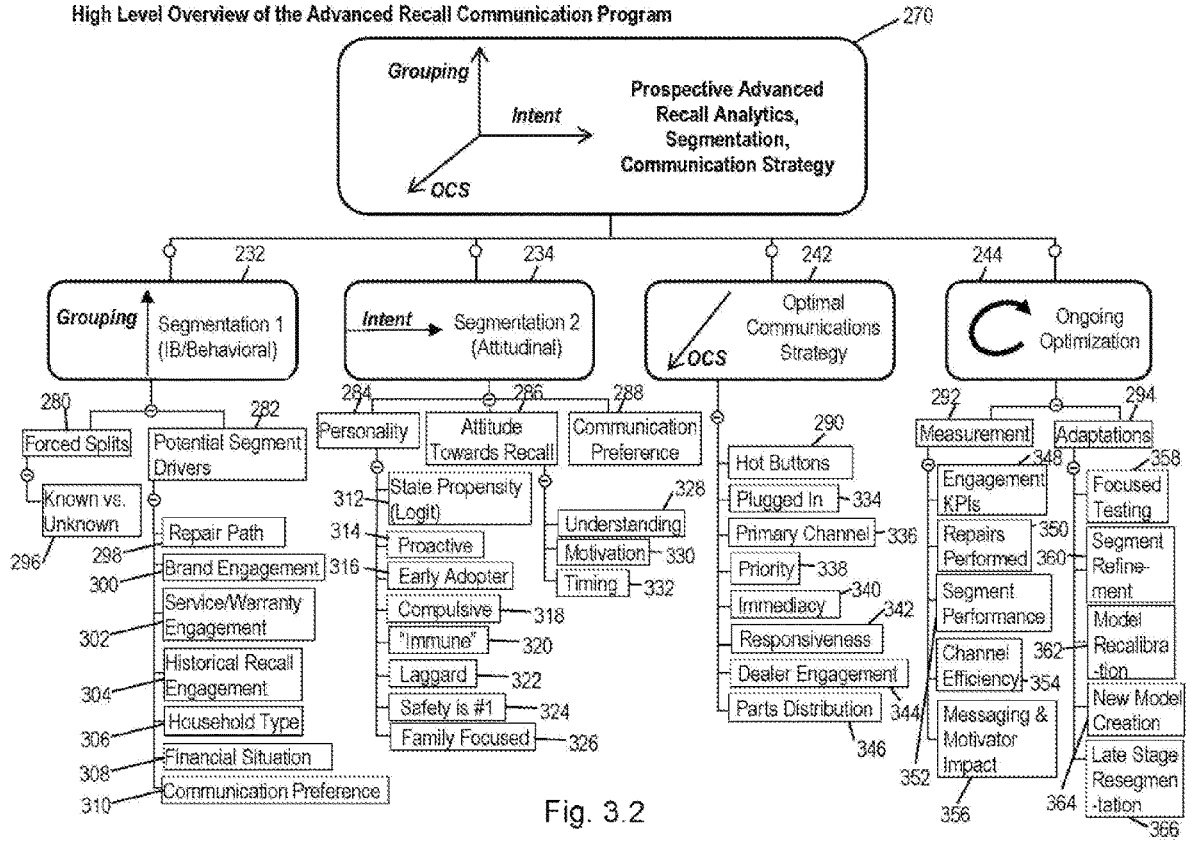
Fig. 3.2

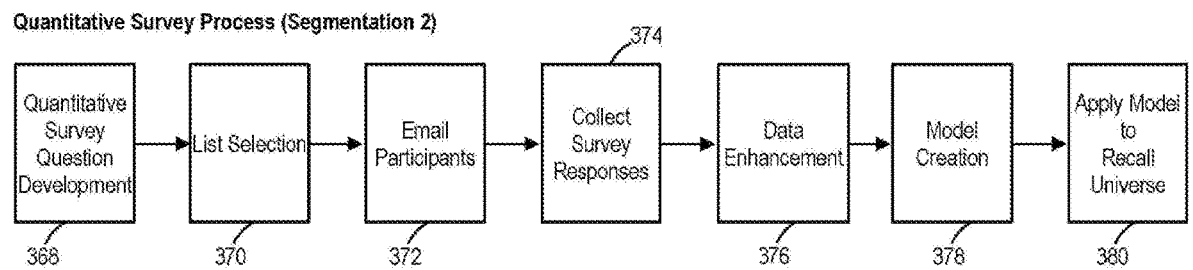
Fig. 3.3
Fig. 3.4

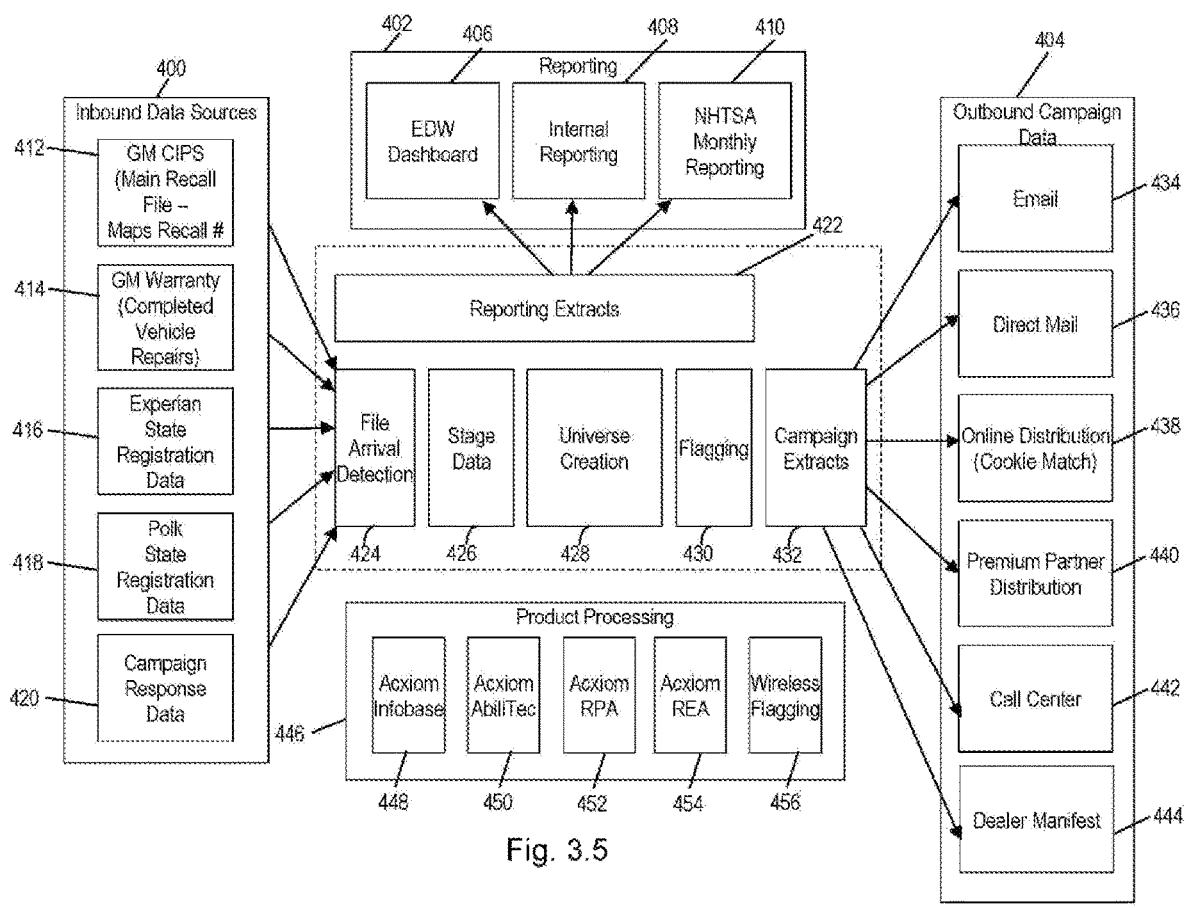
Fig. 3.5

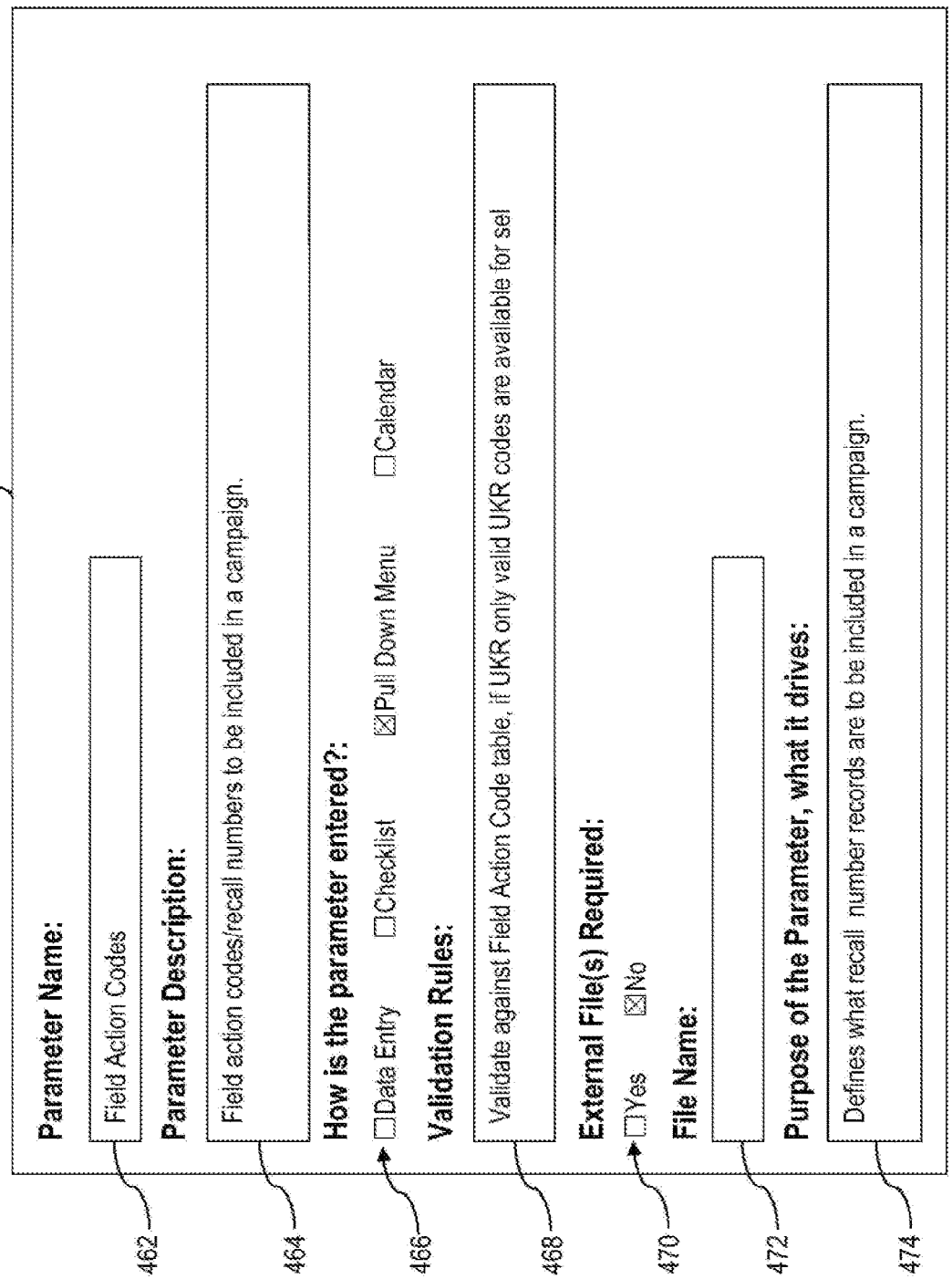
Fig. 3.6

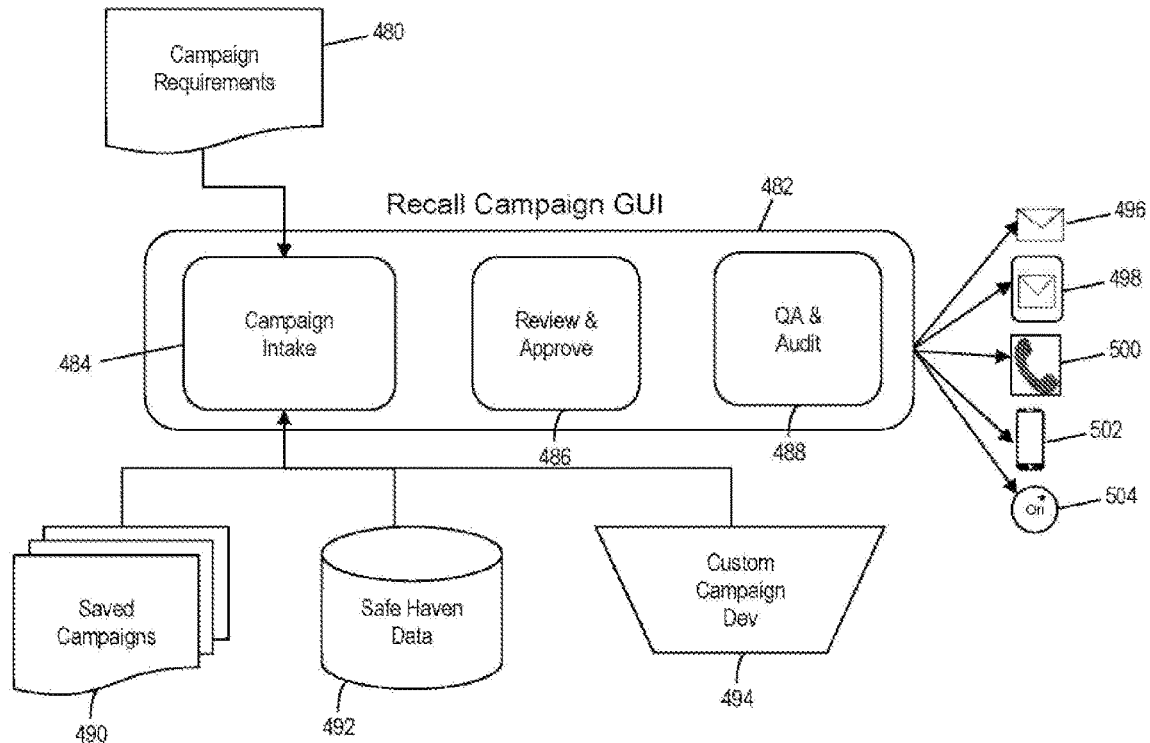
Fig. 3.7
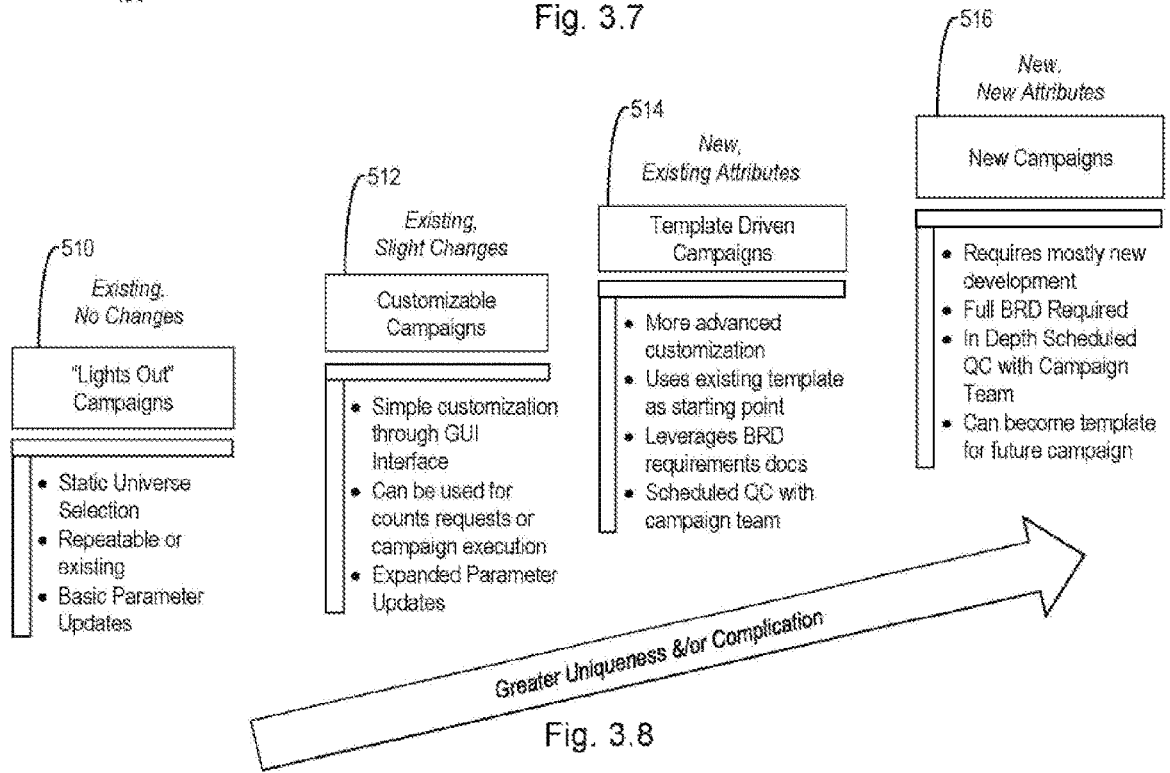
Fig. 3.8

AUTOMOTIVE RECALL SYSTEM AND METHOD

CROSS-REFERENCE TO RELATED APPLICATIONS

This application is a divisional of patent application Ser. No. 15/238,579, filed on Aug. 16, 2016, which in turn claimed the benefit of provisional patent application No. 62/205,896, filed on Aug. 17, 2015. Such applications are incorporated herein by reference in their entirety.

BACKGROUND

As automotive vehicles continue to become increasingly complex machines with a myriad of sensors, on-board electronics, and various active and passive safety measures, automobile recalls have become more frequent, and are one of the preeminent issues facing the automotive industry today. In such complex machines as a modern automobile, a flaw in a single component can seriously impair the vehicle's function and endanger its driver, its passengers, other drivers on the road, and pedestrians. Because of this danger, the National Highway Transportation Safety Administration (NHTSA) of the US federal government has tightened its focus on automobile original equipment manufacturers (OEMs) who do not undertake a prompt recall when a flaw becomes known, in some cases even calling senior executives to Congressional hearings, and issuing larger civil penalties and fines than ever before. In addition, the NHTSA has begun to more closely examine how diligently the OEMs have worked to ensure that all affected vehicles were repaired after a recall was initiated, and is further working to increase the requirements for the number of recalls completed by the OEM.

OEMs spend billions of dollars annually meticulously documenting and investigating possible component issues prior to issuing a recall. Unfortunately, however, launching a recall initiative is only the beginning of the process of remedying the issue, because motivating affected owners to complete the needed repair is frequently a much more difficult and nuanced challenge facing the OEM. Prior to the newly increased NHTSA scrutiny, OEMs have followed a simple and legally mandated path to notify vehicle customers of a vehicle recall. First, the OEM would conduct an investigation that results in a conclusion that the identified issue merits a recall. Next, the OEM would identify the specific vehicle population that is affected by the recall. The OEM would then inform the NHTSA of the specific issue, the affected population, and the status of replacement parts needed to repair the issue. The OEM would then obtain current state owner registration records for all affected vehicles, and send a letter to the vehicle owners explaining the issue and prompting owners to contact their local dealer for a no-cost repair (immediately if parts are available, or later if the parts will be forthcoming). At the OEM's discretion, it might then send simple follow-up communications to a non-repairing owner, such as quarterly postcard mailings, for a finite period following the initial recall launch; in a common example, quarterly postcards might be mailed for a period of two years following the initial mailing to the vehicle owner. Additionally, If NHTSA determines that the OEM's notification program was not as effective as was expected, NHTSA may require the OEM to issue another notification. The re-notification must meet the same requirements as the initial notification and also must include a statement to identify the re-notification as such and urge the consumer to complete the recall.

There are many disadvantages and limitations in this approach to OEM recalls. First, state owner registration records alone are not sufficient to identify the current owner and/or driver of every vehicle subject to the recall; many vehicle owners will simply never receive a notice. In addition, direct mail may not be the optimal channel for reaching all vehicle owners, and a letter may not be the most effective means of engaging and informing owners of the recall. This approach assumes, incorrectly, that every owner will be motivated to make the repair by the exact same type of message, and that every recipient, or at least a great majority of the recipients, will take action after just a single communication, or a similar re-notification message. It further assumes that follow-up communications are best communicated in the same direct-mail medium as the initial contact concerning the recall.

For decades, retailers that own consumer brands have been investing in technology to better understand their customers and tailor messaging and experiences to their needs. This focus on consumers has grown an entire professional services industry that expertly compiles, analyzes, and acts on disparate consumer data points to understand these consumers and their experience with a retail brand. In the end, nearly all of these efforts are dedicated to growing the monetary relationship of the consumer to the brand, essentially selling more products and services. While the possible application of this practice is very broad, within the automotive industry it has been almost entirely focused on driving revenue through sales, which has obscured alternative applications like reaching and engaging owners of vehicle recalls to drive repair compliance. The inventors hereof have recognized that the application of consumer marketing technology and approaches to automobile safety recalls would be highly desirable and could lead to a greater number of consumers engaging in the necessary safety repair. The result could, quite literally, save the lives of vehicle drivers, passengers, and pedestrians. The differences between consumer marketing and automotive recalls, however, make the direct application of consumer marketing approaches impractical, and thus a new system and method must be developed to apply these concepts to improve response rates for vehicle recalls.

BRIEF SUMMARY

The present invention is an automotive recall system and method that is personalized for particular consumers but also operates "at scale," i.e., across the entire spectrum of automotive consumers whose vehicle may be subject to a recall. In certain implementations, it allows for a recall program to operate in many ways different from prior art recall approaches. Instead of relying solely on state registration data to determine the universe of vehicle owners subject to the recall, it also uses OEM owner data. Instead of relying only on direct mail for contacting the vehicle owner, it utilizes cross-channel communications, including but not limited to direct mail, email, live phone, robocall, online banner advertisements, mobile, social, online audio, online video, addressable TV, SMS (text messages), OEM website and/or app information, and even in-vehicle communications. Instead of conveying a single message to every vehicle owner, the messages may be personalized at scale, thus leveraging individualized owner factors that may resonate with the owner and increase and expedite the response rate to the recall notice. Instead of a regular follow-up such as a quarterly postcard only, the invention in certain implementations may allow for multiple ongoing communications to non-repairing owners with varied messages and across varied channels. The follow-up communications may further be tailored based on the individualized response to previous communications of each owner, feedback from the owners, documented delivery issues, or other insights concerning the recall experience.

In certain implementations, the invention results in more complete knowledge of which recalled vehicles are still on the road but have not been repaired; better ability to reach recalled owners through various channels; better information about the existing relationship of each recalled owner to the OEM; better information about the motivation to, barriers from, and perceptions of vehicle repair by affected owners; optimization of future communications with owners; optimization of recall completion options based on feedback, results, or information from the recalled owner; higher overall repair completion rates; faster recall completion; better overall recall experience for recalled owners; stronger long-term brand relationship and trust between the recalled owner and the OEM; a more positive relationship between the OEM and government, such as NHTSA and legislative leaders, based on a progressive, safety-first recall engagement approach; and enhanced public perception of the OEM on safety-related issues.

In one implementation, the invention begins with a master list of all vehicles for a particular OEM with an associated recall. This file may be delivered periodically, such as weekly. It may contain a vehicle identification number (VIN), a recall identifier, and a repair date (if the recall has been repaired). Upon receipt, the file is ingested into the system's data environment, and a rollup is created based on active recalls. The rollup is accessed via a recall management and execution user interface (UI) for users to be able to control communications and active or deactivate a specific recall.

In this implementation, each week a file is posted to the system that contains all non-repaired vehicle VINs for any active recall campaign. A process then picks up this file, and provides all ownership data for the provided VINs. An enhanced view of the affected consumer is then augmented with actual vehicle registration data, if available. Such data is maintained by government motor vehicle authorities and then made available directly or from aggregators, for example, from IHS Automotive (Polk), which processes this data on a monthly basis. In this particular implementation, a VIN list file is pushed to IHS Automotive for it to append registration ownership data. The owner registration data is then picked up and ingested into the recall system. From this data, the system performs data integration, which is a set of business rules to determine which record to take as the current best owner for the vehicle. Once this is complete, the system determines whether additional "enhancement" data is added to the file, such as updated address, phone number, email address, and other contact information for the vehicle owner. This data is then used to drive all of the communication activities administered through the recall management UI. A recall campaign management and execution UI allows for the leveraging of business rules-based recall campaign curriculum assignment; processing events-based (including time-based) triggered communications; storing a library of campaigns for ready access and easy reuse or analysis in the future; providing a user-friendly UI for easy execution of recall campaigns by the OEM; and providing campaign operation teams as the target end user.

The system and method in certain implementations provides for more accurate vehicle owner identification by using multi-sourced data, including the OEM customer data, DMV aggregators such as IHS Automotive, and data append or "enhancement" from marketing services providers, such as Acxiom Corporation.

The system and method in certain implementations provides increased data accuracy for vehicle owners by utilizing customer data integration services, such as the AbiliTec technology from Acxiom Corporation, to accurately identify owner information that may contain name variations (misspellings, change of name due to marriage, etc.) and outdated address data. It can further use customer data integration services to cleanse, standardize, and correct address information to improve the likelihood of accurate delivery. It may further provide additional contact information, such as telephone numbers, email addresses, and online matches to browser cookie pools. Even risk or credit data may be used for this purpose; since recalls are federally mandated communications, the use of risk and/or credit data, which cannot be used for general marketing, may be used for providing notification communications for safety recalls. Channels through which a consumer may be reached include, in various implementations, direct mail, email, telephone, web chat, online banner advertisements, targeted video advertisements, and addressable television advertisements.

It may be seen that the invention, in these implementations, is a "customer-centric" rather than "vehicle-centric" program that in addition to improving recall response also extends the customer relationship between the vehicle owner and the OEM. Since a safety issue has been identified with the vehicle, it is imperative that the OEM do everything practical in order to make the recall a positive experience for the owner in order to encourage the owner to have the repair performed. The system and method provides the capability of achieving this objective while also providing a more positive experience between the customer and OEM.

In certain implementations, it may be seen that an owner with multiple recalls against his or her vehicle, or who owns multiple vehicles subject to recall, may be contacted through consolidated messaging, thereby simplifying the process of keeping up-to-date on recall information for the vehicle owner. Historically, the owner in this situation would have received multiple, disjointed messages that were related to each vehicle only and/or each individual recall only. For a recall that has taken place in the past, the system can learn which channel and which offers and which messaging is most effective, down to the individual customer level. It should be noted here that federal regulations do require that recalls taking place at the same time for the same vehicle must be the subject of separate notices; nevertheless, the system in certain implementations is able to streamline communications with respect to these notices to increase the response rate for recall repairs. Similarly, the system may in certain implementations improve repair response rates when multiple recalls pertain to vehicles owned by individuals residing in the same household. In this case, segment data may be applied to a vehicle owner, i.e., data that defines a certain demographic, lifestyle, or other grouping into which the consumer fits, as well as any data on how other individuals in the household completed recalls in the past. For example, for a particular consumer the recall messaging can be tailored to the messaging and channel most likely to elicit a positive response based on that customer's segment. Also factored into this calculation, and as just one example, can be the fact that another consumer living in the same household had a recall on a previous vehicle at an earlier date and it took a certain number of messages to elicit a response, and in the end the positive response required a telephone call.

In certain implementations, the system uses "closed loop" (feedback) reporting in order to understand what is working in a particular communications round during a recall, and then dynamically adjust based on this data in the next round of communications during the recall period. In a particular example, the information is kept and analyzed on a periodic basis, such as a monthly basis, and may include the universe of consumers that were contacted; additional information about each consumer (such as demographics and lifestyle analytics); when the consumers were contacted; the communications channels used to reach out to the consumers; the segmentation grouping of each of the consumers; creative content used to reach each consumer; and contact and response history associated with each communication. Feedback loops are set up to obtain impression/contact information in various channels. For example, for direct mail, the system may record whether the mail piece was returned as undeliverable; for email, whether the email bounced, whether the consumer opened the email, and whether the consumer clicked through to a landing web page; for an outbound telephone call, whether the consumer was reached, whether the telephone number was in operation, and what the outcome of the call was; and for online, whether the individual consumer matched a cookie pool or premium publisher data, whether the advertisement was displayed to the consumer, and what content was displayed. Repair data that is tracked may include whether the vehicle was repaired, and if so which communication is attributed to having driven the consumer's decision to have the vehicle repaired.

Supply chain optimization results in repair parts being available at OEM dealerships where either the most affected consumers reside or directing parts to regions where most at-risk vehicles are geographically located. In certain implementations, the system provides improved supply chain optimization. For example, suppose there are two markets that have a recall, Market A and Market B. Each of these markets has a dealer that services it, Dealer A and Dealer B, respectively. If each market has 100 vehicles impacted by the recall, but at the current time the OEM has only 20 parts, then the prior art approaches would simply send 10 parts to Dealer A and 10 to Dealer B. The weakness in this approach is that both markets are treated the same, which in fact differences in these markets may impact how quickly recalls can be performed. If, for example, Market A has a greater number of retired persons whose personal schedules are more flexible, then they are more likely to respond quickly than consumers in Market B, which is populated largely by working commuters. Another example can be distance; if the majority of recalled owners in Market A reside within 5 miles of the dealership, while for Market B the majority is over 25 miles away, then the recall in Market A will likely proceed more quickly. In either of these examples, one may see a number of owners asking for repair appointments of, say, 1-15 in Market A but only 1-5 in Market B. If the parts were divided equally between dealers, the result could be that some vehicle owners will wish to have the repair performed but be unable to do so because parts are not available at the dealership, while the other dealership has unused parts sitting on the shelf. The system, in certain implementations, utilizes previous recall behavior by owner segments to gauge differences in time to recall work for different segments. If earlier recalls showed the difference in behavior, then in this example, more parts are sent to Dealer A than Dealer B. Data that drives this calculation in the system may include owner segments and location for the current recall; owner segments, appointment pace, and recall completion rate for previous recalls; and current availability and availability schedule for parts inventory drawn from the OEM data systems. This data may be used to supersede the basic segment-level estimates for an individual consumer or household. In the case of an individual having multiple recalls, then in one example only the most recent recall will be used as an example. Another factor that may be considered is the vehicle type for each recall based on past responses for vehicles of that type.

Supply chain optimization can be particularly important where a certain region has more at-risk vehicles than other regions of a market area. A past example of such a recall is the Takata airbag recall, in which repair was most critical in areas of higher humidity since the part failure was more likely in those areas. Using the system in certain implementations as described above, repair parts can be directed on an expedited basis to those areas where the repair is most critical. In addition, when a supply shortage occurs, communications can be provided in a manner so that dealers are not overwhelmed with repair demands prior to the parts being available to the dealer. This improves dealer efficiency and reduces frustration of an owner who attempts to schedule a recall repair but cannot do so because no parts are presently available. In addition, it may be seen that having historical vehicle ownership information allows for a more advanced recall program that identifies vehicle migration patterns that may identify vehicles that are more critical for a recall. In the Takata example given above, it would be valuable to identify those vehicles that are currently located in low-risk areas but were previously operated in the higher-risk, high-humidity regions. The system, in certain implementations, makes it possible to prioritize communications with the particular owners of such vehicles even though the owner currently resides in an area that is considered of lower risk.

Another advantage of the invention in certain implementations is repair workforce optimization. This works similarly to supply chain optimization, but additional factors considered are the time needed to complete a recall; the day of week information for previous recall completion (week day or weekend); and, if available, the time-of-day information for previous recall completion by segment. This information provides additional insights into periods when additional service technicians are needed. For example, in the previous example of Dealer A and Dealer B, assuming each recall takes ten minutes to complete, and assuming both dealers must complete 100 recalls, they must provide 1000 total minutes of recall work over a period of time. In the previous example then, Dealer A will need more available time for recall work in the first week of the recall compared to Dealer B. More generally, workforce optimization helps ensure that the dealer has the capacity at the right day of the week and time of day when recalled vehicle owners are likely to ask for appointments.

In addition, workforce optimization using the system in certain implementations of the invention allows for the dealer networks of an OEM to work together to optimize the service department workforce of each dealer. Rules may be established for assigning of recall repairs to different dealerships, and once assigned, the OEM will be able to notify each dealer, inform the dealer how many potential vehicles may be expected for recall repair work, and what level of staffing will be required for the repair facilities. Communication strategies to consumers can be optimized based upon the particular dealer assignments to prevent an overload at a particular dealer, which could frustrate consumers who are unable to schedule a recall repair.

Another advantage of the invention in certain implementations is the capacity for personalized strategies for repair methods. Examples of repair strategies include completing recall work at the vehicle owner's home, home/office vehicle pick-up and drop-off service, extended dealership hours, weekend dealership hours, and mobile recall sites such as at a commuter parking lot. Adding these options allows the dealer to help plan for the right programs for a particular area or group of vehicle owners; inform vehicle owners and focus on the recall options that may resonate most with them; and utilize owner segments, vehicle segments, current campaign performance, and previous recall performance to optimize results.

Another advantage of the invention in certain implementations is cost optimization. By providing for the more efficient allocation of repair parts, service personnel, and the appropriate strategy for repair methods, the overall cost of the recall to the OEM and its dealers may be reduced. Using the best-known combination of channels and messaging to expedite completion of a recall decreases ongoing outreach through inefficient channels. For example, if a vehicle owner is not responsive to telephone messages, then continuing to call and leave messages is a waste of OEM resources.

Another advantage of the invention in certain implementations is that by improving recall response the safety of vehicles for the owners and the general public is improved. This is achieved by reaching the vehicle owner through the optimal channel to improve response, and by ensuring that parts are available and service personnel are available at a time and in a manner that encourages the owner to promptly complete the recall repair.

An important concern in any use of personally identifiable information (PII) of consumers, including in this particular case of automobile recalls, is the privacy of the consumers' PII. In certain implementations of the invention, all consumer data utilized in the recall program is fully anonymized (i.e., stripped of all PII) before any action is taken that involves digital communications channels. Using well-known hashing algorithms, a unique, anonymous link can be created to match non-PII consumer data to a set of cookies or device IDs or pixel data belonging to a particular consumer. This joined data (again, with PII removed) may be further hashed, using well-known techniques such as SHA-256, to create a customer link that is utilized to build small, lookalike segments. In this way, regulatory compliance and privacy of the consumer is ensured, while at the same time leveraging better targeting for recall communications within a segment, including use of messaging in the digital space. In certain implementations, privacy is further maintained through the use of a separate data store in which no PII is maintained. This data store is maintained by a neutral third party host, such as a marketing service provider like Acxiom Corporation. In this way, parties that are not allowed to access certain data, such as risk data or credit data, are never allowed access to this data, and yet it can be used for identification purposes in order to create the record for a particular consumer. The data store in these implementations may be secured, encrypted, and segregated from all other data stores in order to ensure against any contamination of the data store with PII data or any other party accessing the data.

It may be seen that as each recall is performed with the system according to certain implementations of the invention, the system improves based on the expanding body of knowledge acquired from previous recalls. Data may be analyzed to determine, for example, the best communication channel by owner segment and/or vehicle segment. The data can be analyzed more granularly down to, for example, the particular model of vehicle involved in a recall.

These and other features, objects, and advantages of the disclosed subject matter will become better understood from a consideration of the following detailed description and drawings.

BRIEF DESCRIPTION OF THE DRAWINGS

FIG. 1.1 is an overview diagram of the management process implemented by the recall system according to an implementation of the present invention.

FIG. 1.2 is an overall solution view from an environment perspective of the recall system according to an implementation of the present invention.

FIG. 2.1 depicts the high-level data flow from source systems through campaign fulfillment vendors with a feedback loop to facilitate reporting according to an implementation of the present invention.

FIG. 2.2 depicts the six core files brought into the solution on a periodic basis according to an implementation of the present invention.

FIG. 2.3 depicts the process of matching VINs and creating a single dataset before executing a recall kit shipment process and warranty claims according to an implementation of the present invention.

FIG. 3.1 is a high-level view of a campaign methodology flow from exploratory analysis through the segmentation process and communication optimization according to an implementation of the present invention.

FIG. 3.2 is a detailed view of end-to-end campaign strategy execution flow according to an implementation of the present invention.

FIG. 3.3 is a data flow of segmentation through quantitative survey process and subsequent model creation and application according to an implementation of the present invention.

FIG. 3.4 is a sample matrix showing demographic/behavioral segmentation with attitudinal segmentation according to an implementation of the present invention.

FIG. 3.5 is a detailed view of the entire solution including data ingestion and integration components, data enrichment, analytics, and reporting and campaign communications according to an implementation of the present invention.

FIG. 3.6 is a sample of the parameter-driven UI for the system according to an implementation of the present invention.

FIG. 3.7 is a campaign flow enabled by the campaign UI tool of the system according to an implementation of the present invention.

FIG. 3.8 is a graphic depicting categories of campaigns enabled by the campaign UI tool of the system according to an implementation of the present invention, shown in order of uniqueness and complexity.

DETAILED DESCRIPTION

Figure 4:
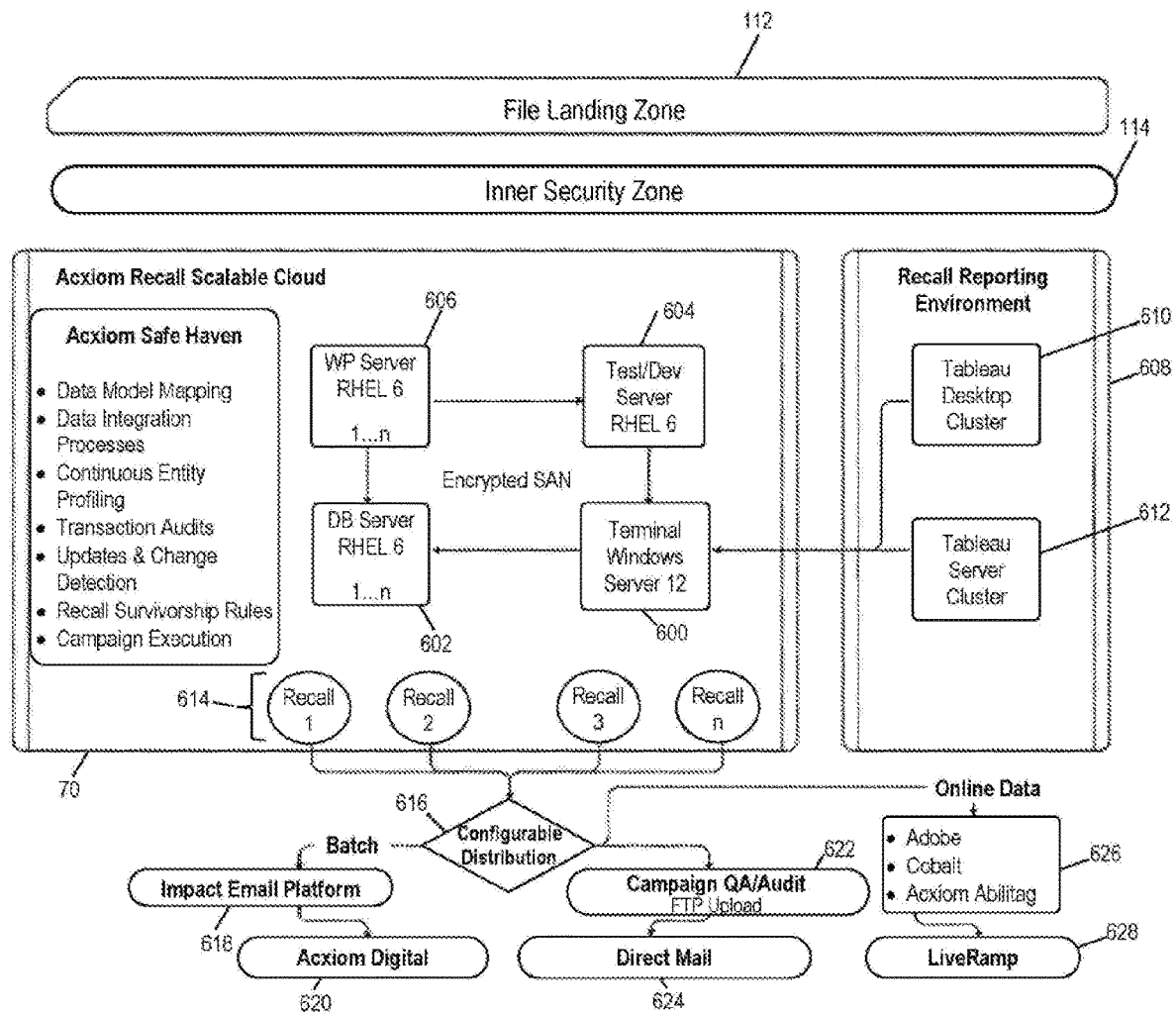
FIG. 4 is a system diagram of hardware components and connectivity according to an implementation of the present invention.

In FIG. 1.1, an overview of a process flow for managing a recall using a system according to an embodiment of the invention is illustrated. A web-based application 14 is used by the OEM to activate or deactivate a particular recall. Once activated, active recall VIN list 16 is used to identify those vehicles subject to the recall. Active recall VIN list 16 includes a VIN, recall ID, and repair date (if a recall has been repaired already). This list 16 is developed from receiving the weekly recall campaign file 10 and performing load and rollup process 12. The rollup is accessed, as will be described following, via the recall management and execution UI through the web-based application 14. Weekly response data 50 is fed to an extract, transform, and load (ETL) process 52, where it is ingested into the system and used in the feedback loop aspect of the system as described herein.

Each week, active recall VIN list 16 is posted to the system; the active recall VIN list produced at step 18 contains all non-repaired VINs for the active recall campaign. This data is augmented with ownership data in the following process steps. The data is sent for a customer relationship management (CRM) append at step 20, the weekly CRM data is received at step 22, and the master database is updated at step 24.

This enhanced view of the affected vehicle owners is augmented with actual vehicle registration data on a monthly basis. At step 26, a monthly VIN list is created. This list is sent to an OEM data provider, such as IHS (Polk), to append the registration ownership data at step 28. The following day, the owner registration data is picked up at step 30, and the master database is updated at step 32 by which the system ingested this monthly data. It may be seen then that in this embodiment of the invention both weekly and monthly data are used as two primary feeds, and business rules are then used to identify the record to use as the current base owner for a vehicle with a particular VIN.

After the weekly and monthly data feed processing are complete at any given time, enhancement data may be considered. If a new business is identified as a VIN owner at step 34, then this data may be sent to a provider of business enhancement data, such as Dunn & Bradstreet, at step 36. Once the enhancement data is received back at step 38, then the master database is updated with enhancement data for this business at step 40. Likewise, if a new individual is identified at step 42, then this information is sent for enhancement through a service such as the Infobase data enhancement service offered by Acxiom Corporation, at step 44. The enhancement data is received back from the individual enhancement service at step 46, and the individual information in the master database is updated at step 48.

Leveraging the Dunn & Bradstreet business data attained in step 36 allows for the system to identify specific business names and addresses that indicate a vehicle may not be on the road. Generally speaking, state registration data include title flags denoted scrapped or destroyed vehicles. These flags are used for general suppression for high-touch owner engagement programs (i.e., advanced outreach). Unfortunately, these flags are incomplete or lag real-world events to the point that vehicles that are not drivable may still have a clean title for months or even years after they are listed as scrap or destroyed. By further analyzing the business name for categories such as Insurance, Auction, Salvage, Towing, and Scrap Yard, the system further optimizes the target population for outbound communications. Yet another approach in an implementation of the system is to analyze the registered address and compare it to known vehicle scrap yard locations. A VIN for a completely totaled vehicle may be in a scrap yard, but the registered name is either an original owner or the insurance company that settled the claim. The net result of this additional processing is a more accurate and active unrepaired VIN population on which to focus communication investment.

Turning now to FIG. 1.2, an overview for the system according to an implementation of the invention may be described. Inbound data at the system is received at block 60. This data may be received through file transfer protocol (FTP) process at step 62, in a public-facing, i.e., "DMZ" system, which is separated from the internal FTP process at step 66 by inbound firewall 64. Likewise, outbound data from the system at block 76 may be sent through a public-facing DMZ FTP system at block 82, which is separated from the system's internal FTP system at block 78 by outbound firewall 80. Firewalls that separate internal from DMZ systems are well known in the art.

Data is stored in the system in data environment 70. In certain embodiments, this data environment is carefully maintained to be free of PII, and is segregated from any systems that store PII, in order to maintain complete privacy for the consumers whose data is maintained in data environment 70. Data environment 70 is further protected by data environment firewall 68. A recall processing server 72 provides the processing hardware for the various operations performed at data environment 70. In an embodiment, recall processing server 72 may be implemented using the Linux 6 operating system and SAS data analytics software. The actual storage for data in data environment 70 is provided by storage frame 74. In an embodiment, storage frame 74 may be implemented with the Storwize V7000 storage infrastructure hardware provided by IBM.

The system uses a number of enhancement features from a marketing services provider. Knowledgebase 86 maintains a master repository concerning individuals and businesses in a particular geographic area of interest, such as the United States. This database may be used to perform matching in order to further the enhancement data functions provided by the marketing services provider. The AbiliTec linking service by Acxiom Corporation may be used in a particular embodiment of knowledgebase 86. Enhancement function 88 provides additional data concerning an individual or business, including demographic, firmographic, purchasing, and lifestyle data. Enhancement function 88 may, in an embodiment, be the InfoBase enhancement product offered by Acxiom Corporation. Phone append function 92 is the addition of a telephone number to an existing consumer or business file, while reverse phone append function 90 is the provision of a name or address associated with a given telephone number. Numerous marketing services providers are available that provide these services. Likewise, email append function 94 and reverse email append function 96 perform a similar service with respect to email addresses. Customer data integration (CDI) function 98 provides for the consolidation and management of customer (or business) data from all available sources, typically using an internal, unique link for each unique entity in order to maintain a connection between all data related to an entity over time. The AbiliTec CDI solution from Acxiom Corporation may be used to implement CDI function 98 in one embodiment. Particular CDI implementations are more thoroughly discussed in U.S. Pat. Nos. 6,523,041 and 6,766,327, which are incorporated by reference herein in their entirety.

Turning now to FIG. 2.1, a high-level data flow from source systems through campaign fulfillment vendors with a feedback loop to facilitate reporting according to an embodiment of the system of the present invention may be described. Source data systems 110 are responsible for creating, formatting, and transmitting data in agreed-upon formats to the system on a predetermined schedule. All source data systems 110 transmit data files to the system via FTP or SFTP (secure FTP) to the system. Once the data files arrive on the external (DMZ) side of the FTP incoming system landing zone 112, the files are detected and transferred to the internal side of the FTP landing zone (i.e., the internal network) at incoming FTP landing zone 114, thereby passing through the intake firewall as discussed previously.

Once the files are transferred to the internal side of the FTP system, they remain stored here until a time-based job triggers to detect the files and then transfer them via FTP to the system recall environment 116. Upon receipt at recall environment 116, jobs will execute that rebuild the current vehicle ownership data views and associate activity data so that a complete, campaign view of the owner base is available.

Upon completion of the rebuild jobs, the environment is ready for extracting campaign and reporting files. Once these files are created, they are pushed out to the internal side of the outgoing FTP landing zone 118, where they are then detected and moved over to the external (DMZ) FTP landing zone 120. Campaign fulfillment vendors 122 then execute campaigns via direct mail, email, phone, online distribution, or other means, in order to capture disposition data and then send that disposition data back to the recall environment as an inbound data source at source data systems 110. This allows for the feedback mechanisms discussed herein.

Turning now to FIG. 2.2, it may be seen that there are six core files that are brought into the system on a weekly or monthly basis in order to create a complete view of the customer recall universe. The core driver file that identifies all VINs associated to a specific recall is the master VIN data file 136. This file contains VINs, associated open field action code (i.e., recall number), an indicator to flag if the VIN was repaired or not repaired, what dealer completed the repair, and when it was completed. Upon receipt of master VIN data file 136, a listing of the VINs is sent to the client customer relationship management (CRM) environment through FTP service 142. The CRM environment is used to obtain a listing of individual consumers who still own those VINs and are known within the client first-party marketing database. Consumers found within the CRM environment that still own the vehicle are classified as the "known" universe since the marketing services provider has a wealth of data on these consumers from its interactions with the OEM and dealer networks. This wealth of information includes current engagement at dealerships for purchase and service history, model score information used for marketing/segmentation purposes and possibly disposal information. Specifically, this includes first-party CRM owner data 130 and first-party CRM service data 132. In addition, a listing of VINs is also sent to one of the DMV aggregation companies that purchase state DMV data (such as IHS/Polk or Experian) to obtain a listing of current registered owners of all the affected VINs. Information received from the DMV aggregation companies consists of registered name, address, phone, and email data. The data from the DMV aggregation companies will eventually become the "unknown" universe of owners since the marketing services provider has less data available on them (they are unknown to the OEM). Other intake data includes the list of active dealers in active dealer data 134, data on vehicle warranties at warranty data 138, and campaign response data (i.e., feedback data) at campaign response data 140. After file detection at step 144 and staging of the data at step 146, the data is split for product processing at step 148, depending upon whether enhancement data is needed. If so, then processing moves to step 152, where such data is detected and enhancement data is received from the marketing services provider at step 154. If enhancement data is not needed for a particular consumer record, then at step 150 this data is detected. Both data streams converge at step 156, where the universe view of the VIN database is reconstructed. Segmentation of this data is then added at step 158, as will be described in more detail following.

In conjunction with FIG. 2.3, a more detailed view of recall processing may be described both for known (to the OEM/dealers) owner VINs and those obtained through state registration files. Once the recall environment has received back data from both the CRM environment at step 180 and the DMV aggregation company at step 186, the data is then sent to product processing to have CDI links applied, at steps 182 and 188, respectively. The CDI links are obtained from the knowledgebase mentioned previously, and they allow the system to identify individuals (or businesses) across name variations and temporal horizons. Once the consumer, address, and business CDI links have been applied, a connected mobile experiences (CMX) analytics package may be applied at steps 184 and 190, respectively, which collects aggregate location data from wi-fi users. The owner universe can then be created at step 192 utilizing the following rules by joining the CRM and DMV aggregation company data together. First, the CRM file is matched to the DMV aggregation company data by consumer CDI link and VIN; when matched on both the consumer CDI link and VIN, then the system keeps the record from the CRM file and flags it as a "known" record. The DMV aggregation company record is discarded in this instance. Second, when matched on only VIN but not consumer CDI link, then the CRM record is discarded and the DMV aggregator record is kept as an "unknown" record. In this instance, it means that the individual the OEM currently believes to own the vehicle is not believed to be correct so the DMV aggregator record is kept as a replacement to the OEM record. Third, when there is no match on the DMV aggregator record to the CRM record, then keep the DMV aggregator record as an "unknown" record. In this instance, it means that the OEM no longer knows who owns this VIN so this is the system's only point of reference.

To match VINs that are subject to a particular recall with the master list, a list of all affected VINs from the OEM is ingested at step 170. Traditional data merge and dedupe functions are performed at step 172 to result in a file in which each record is associated with a single VIN. In the case that the recall is limited to a particular region, such as the United States, then all foreign VINs are stripped out at step 174. At step 176, this data is then compared to the dataset that results from step 192 to determine which VINs that are subject to the recall remain unknown.

Once the matching criteria has completed at step 192, the system will have a complete listing of individuals that own the recalled vehicles. The system will also have a listing of VINs (vehicles) that currently have no registered owner data identified from step 202. These VINs are identified by taking the complete universe population and performing an outer join to the master VIN file. If a VIN is on the master VIN file but is not on the universe file, then the system does not have any current ownership information for that VIN. Therefore, these VINs get placed into a watch list so on a monthly basis the system can request a query of the state registration data through the DMV aggregators to determine if the vehicle was registered by a new owner.

Now that the system has a universe of owners (known and unknown combined), it is able to start processing of additional product data. The universe file is sent over to the marketing services provider again in order to have a series of data elements applied along with processing through the phone processing products in order to grab an indicator which will identify the phone number(s) as a wireless number or landline, which is needed for robocalls out of the call centers. The Infobase product, provided by Acxiom Corporation, is used in one embodiment. Infobase provides enhanced data about a customer's demographic, preference, and infographic attributes which allows the system to build a complete customer view in order to create more effective and targeted messaging to the consumer.

Using the single dataset from step 192, several matching processes may be performed within the system. Execute model score match 178 is used to assign owners to the different owner segments designed to be mutually exclusive, i.e., to score the population against models to determine what percentage of the recall population is matched to a particular segment. Old owners of the vehicle for each VIN may be identified at step 194; this may aid in communications for the recall process. Owner service data match step 200 and owner engagement data match 204 are also performed, identifying vehicle service data and engagement with the dealer data, respectively. Once these processes are complete, processing moves to do-not-contact step 196, where consumers are removed from the file that are on any state- or federal-maintained do-not-contact list.

Various flags are added to the record for each VIN, which identify the stage of the recall process for that VIN. This process begins at step 198, and uses a number of types of data that are ingested into the system. Repair parts/kits ordered for each VIN are ordered at step 208, and kits shipped are identified at step 210. This data is used to determine if a flag for parts ordered is set to a "yes" or "no" value; if either of these data are present for a particular VIN, then the "yes" value for parts ordered is set. Likewise, the parts shipped flag is set to "yes" at step 212 if the kits shipped data at step 214 (which is the same data as received at step 210) is found for a particular VIN. Warranty claims paid data received at step 218 is used to determine whether the flag for the VIN repaired is set to "yes" for a particular VIN record at step 216. Various analytical functions may be performed at step 220, and information is provided to the dealer through a UI at step 222.

As just described, FIG. 2.3 depicts an approach and methodology according to an embodiment for running an effective advanced recall program for an OEM client. There are eight major processes within this program (not including the data integration processes defined earlier in this document), as depicted graphically in FIG. 3.1. The eight areas are:

1. Exploratory Data Analysis (230)
2. Segmentation 1—Behavior/Demographics Driven (232)
3. Segmentation 2—Attitudinally Driven (234)
4. Application of segmentations 1 and 2 (236)
5. Combining of Segmentations (238)
6. Definition of Segment Profiles (240)
7. Communication Plan Development (242)
8. Execution, Test and Optimization of Communications (244)

Exploratory data analysis 230 is the first step performed within the system. This process can begin once data has been ingested into the system from the OEM CRM environment, the DMV data aggregators, and warranty systems as a complete data set now exists of the affected vehicle owners and their current repair status. A complete owner file containing name and address will be created from the system and sent over to a marketing services provider for enhancement, to have the global analytics data package appended to the file. The global analytics data package provided through Acxiom Corporation's Infobase, as used in an embodiment, consists of over 1000 lifestyle, demographic, and modeled information on each individual/household. Once the data append has been completed at step 246, a data portrait analysis is completed. The data portrait analysis takes the recall universe, divides it by repaired and non-repaired and then compares each element against a reference population. In this case, the reference population is a sample of the population in the United States to determine which elements are over-represented in the recalled owner universe vs. the national average in the United States. The purpose of the exploratory data analysis is to begin getting an understanding of what the population looks like for this recall universe and begin understanding what enhancement elements may be beneficial in the modeling activity so modelers can focus on over-represented variables instead of wading through all 1000+ elements. Once the elements are created they serve as available, off-the-shelf starting points in the system for the next set of recall campaigns. The owners of a new recall campaign can be scored against the segments available in the system for the segment-based strategy for the recall campaign. As-needed new segments may be created to account for new challenges, e.g., recall for electric vehicles, or refreshed to factor in macro changes in the environment.

Finally, the findings of the exploratory data analysis provide the recall strategist a starting point to begin defining what the population segments may look like. This allows for pre-planning with advertising agencies regarding communication approaches and definition of early channel preferences for recall communication planning. As noted above, previously developed segments available in the system can serve as a starting point in lieu of creating new segments. However, new segments may be created as needed. The segments available in the system can remain in the system for the next set of recall campaigns. The owners of a new recall campaign can be scored against the segments available in the system for the segment-based strategy for the recall campaign.

For segmentation one step 232, the process starts with the same enhanced data set as the exploratory data analysis utilized. To start, the modelers will force split the file into two distinct datasets at step 248. The first data set would be the owners who were sourced from the OEM CRM database and the second data set would be the owners who were sourced from the DMV data aggregators.

The objective of segmentation one step 232 is to utilize key dimensions from behavior data (OEM sources) and demographic, lifestyle and interest data (from the marketing services provider) to separate the recall population(s) into relatively homogeneous segments with the goal of optimizing communications (messaging, channel, number of communications, motivation for repair) for each segment in order to drive individuals to complete recall repairs. Segmentation one step 232 utilizes k-means clustering supported by Principal Component Analysis (PCA) and Factor Analysis (FA) to derive and assign each individual to one segment. During the segmentation analysis, the force split comes into play between the OEM and non-OEM sourced data. Due to this forced split, the individuals from one population will not be in the same segments as individuals from the other population. FIG. 3.2 shows this process in more detail, as three dimensions of grouping, intent, and optical communications strategy (OCS) in diagram 270. The segmentation 1 step 232 is the "grouping" or "behavioral" dimension. Forced splits step 280 results in the division between known and unknown sets 296. Potential segment drivers at step 282 may be divided into factors such as repair path 298, brand engagement 300, service/warranty engagement 302, historical recall engagement 304, household type 306, financial situation 308, and communication preference 310.

Segmentation 2 step 234 is the "attitudinal" dimension of graph 270 in FIG. 3.2. It provides clustering, optimization, and review functions at step 250 of FIG. 3.1. In order to obtain the highest repair rates possible for vehicle safety recalls, one or more quantitative surveys at different points in time are applied against the owners within the repaired and unrepaired data sets. It is not sufficient to simply understand who owns the vehicle, whether the owner completed the necessary repair, or even demographic/lifestyle information. Rather, it is desirable to understand what the affected owners are thinking and understand their barriers and motivations for getting their vehicle safety defect repaired. This includes, referring now to steps shown in FIG. 3.2, determinations regarding personality, attitude towards recall, and communication preference, which are performed at steps 284,286, and 288, respectively. Under personality, possible data elements are stage propensity 312 (i.e., life stage of the VIN owner); proactive personality trait 314, early adopter trait 316, "immune" (i.e., won't respond under any circumstances) trait 318, laggard trait 320, "safety is #1" trait 324, and "family focused" trait 326. Under attitude towards recall, traits may include understanding trait 328, motivation trait 330, and timing 332.

Referring now to FIG. 3.3, the process steps for performing the quantitative survey may be described. The questions are first developed at step 368, based on the traits shown in FIG. 3.2 and described above, in conjunction with OEMs and their advertising agencies. List selection is step 370 is the determination of lists from which the survey question recipients will be determined. A varied population within the universe of VIN participants may be used, and in one example a random sample of owners from the repaired and non-repaired recall universe are selected. Email participants step 372 is the step of actually sending out the questionnaire by email to the selected participants. At collect survey responses step 374, the responses received through any channel are collected. At data enhancement step 376, the survey responses are merged back with the enhancement data (such as from the Infobase product from Acxiom Corporation) added to the universe data at the exploratory data analysis step 230. At model creation step 378, a model may be created that provides additional information, such as most desired communications channel or communications content for the list participants. Finally, at step 380 the results of this model are applied to the universe of recall VINs in order to drive higher response rates.

It may be seen that the objective of segmentation 1 step 232 is to utilize key dimensions derived from the survey questions to split the population of recall individuals sampled who responded to the survey into relatively homogenous segments. The goal of segmentation 2 step 234 is to optimize communications (i.e. messaging, communication channel(s), number of communications and motivation to getting their vehicle repaired) for each segment in order to drive individuals to complete recall repairs. System-based analytics are then used to build an algorithm (such as by multinomial logit/discriminant analysis) to assign each of the survey respondents into one of the resultant segments using only non-survey data (i.e., data from a comprehensive database such as Infobase from Acxiom Corporation). Once the algorithm has been built, it is run against the entire recall universe to assign each individual within the recall population to one Attitudinal Segment, such as those identified above as traits 314-326.

Once the two segmentation steps have been completed, the result is that each individual in the data set is assigned to a behavior/demographic segment and assigned to an attitudinal segment. Referring to FIG. 3.1, it may be seen that this is achieved by applying segmentation 2 to the total population at step 236 using predictive models at step 252. Once this is complete, the segmentations may be combined at step 238 to create a matrix and micro segments at 254. An illustration of the system-based matrix is shown in FIG. 3.4 as matrix 390. This matrix 390 provides additional precision for the population.

Now that the segmentations have been completed and they have been combined into a matrix, the segment profiles can now be created at step 240. For each segment (e.g., the forty different behavioral/attitudinal segments in the example matrix of FIG. 3.4), a marketing strategist will begin developing personas for each segment. Each persona will contain information comparing/contrasting that persona to each other by defining the key characteristics, similarities and differences at step 256. The goal of creating the personas is to help the communication team better understand who their targets are for each segment, how to best obtain the wanted response, and what messages will best resonate with that group. The system ensures that relevant data from various sources is enhanced, cleansed and made available for the analysis to take place. The results of the analysis are provided back to the system to identify what personas apply to which owners. The personas once developed reside in the system and are used as an off-the-shelf starting point for quick launch of future campaigns. Additionally, each recall communication cycle or new recall adds to the information about performance for personas.

The communication strategy is then developed at step 242 of FIG. 3.1. This step is performed by the system in conjunction with the OEM and/or the OEM's advertising agency. The communication strategy process begins by taking the personas/segment profiles created previously and further defines the profiles to build a targeted marketing communication strategy to get the individuals contained in each segment to respond in the appropriate manner during the recall campaigns. Messaging is defined, creative is built, and testing strategies are created in order to test what works best with each segment. Referring now to FIG. 3.2, this process may be broken down further. Factors that may be considered in determining the communications strategy include "hot buttons" factor 290, "plugged in" factor 334, primary channel factor 336, priority factor 338, immediacy factor 340, responsiveness factor 342, dealer engagement factor 344, and parts distribution factor 346.

Now that the communication strategy has been defined, the recall campaign files for campaign execution may be created at step 244. The initial specifications for the file-pull along with how to break up the file between test and control segments and channel distribution have already been defined. The specifications are submitted to an advanced system team to create the extract files, send them through a quality control process, and then release them out to the various fulfillment vendors for production release.

Once the campaigns have been executed, measurement can begin at step 260. Each week with the update files from the warranty system, the system is able to generate reports showing how many communications by channel were executed, how many vehicles were repaired in the previous week, and create updates to the universe owner table to reflect the appropriate state changes. In addition, if any of the communications were undeliverable (i.e., direct mail, outbound phone call, or email), that information is also captured in the closed-loop process in order to mark those data points as invalid for the related consumer.

Measurement steps 292, shown in FIG. 3.2, may be broken down into engagement key performance indicators (KPIs) 348; repairs performed 350; segment performance 352; channel efficiency 354; and messaging and motivator impact 356.

Now that reporting exists on effectiveness, further optimization of the communication process can begin. Feedback from the initial campaigns, and how effective they were, are taken and analyzed by the system and the advertising agency. Understanding of how each channel performed, how subject lines, content, phrases and talk tracks worked will be tied into the repair rates and adjustments made to the next iteration. The process loops through the development (or redevelopment) of the communication strategy and execute, test and optimize on a monthly basis. Every quarter, the segmentation and modeling activities are repeated to tweak and move individuals as required based on past performance of the segments for repair. As each month goes by and the vehicles-to-repair population dwindles, the makeup of the segments will drastically change as these are the individuals that are late adopters or will likely never fix their vehicle without further communication, targeting, and possibly even incentives. Adaptation steps 294, which may be made as part of ongoing optimization step 244, include focused testing 358, segment refinement 360, model recalibration 362, new model creation 364, and late stage re-segmentation 366, all as shown in FIG. 3.2.

Referring now to FIG. 3.5, the system may be defined and discussed in terms of information flows into and out of the system. As previously noted, prior art recalls in the United States have been the subject of notices sent solely by US Mail. A follow-up post card was typically mailed if the owner did not repair his or her vehicle at, for example, the six-month interval. This process was potentially repeated at 12 months. The system in the disclosed embodiment extends the available channels to any channel were the vehicle owner can be found and channel preference is taken into account as the communication is designed and implemented. The communications channels that may be utilized in an embodiment of the system are:

1. Direct Mail
2. Email
3. Outbound Phone
4. Web Chat
5. Online (Digital, Mobile, Social, Search, Display)
6. Targeted Video
7. Addressable Television Furthermore, the system does not limit communications for an individual to any one specific channel. If the system has direct mail, email, and ability to identify the individual online, then that individual may be targeted across all three mediums in order to achieve the best message exposure and incentive for him or her to get the vehicle repaired.

In order to implement the omni-channel approach of the system according to certain implementations of the invention, contact information may be obtained from the following sources:

Direct Mail—OEM CRM, DMV Aggregators, CDI and Append Services;

Email—OEM CRM, DMV Aggregators, Email Append Services;

Telephone—OEM CRM, DMV Aggregators, Phone Append Services;

Web Chat—Proactive Request by affected owner via website;

Online—onboarding services (such as provided by LiveRamp), matching of first party data to online cookie pools in addition to first party data matches to premium publishing partners;

Targeted Video—onboarding and first party matches to premium publishing partners; and Addressable Television—onboarding and first party matches to premium publishing partners.

As mentioned previously, all system communications along with activation/deactivation is performed through a single proprietary UI, thereby simplifying the use of the system for OEMs.

The specific inbound data sources 400, as shown in FIG. 3.5 for an implementation of the invention, include a main recall file 412, warranty (i.e., completed repairs data) from the OEM 414, state registration date from a first provider and second provider, blocks 416 and 418, respectively; and campaign response data 420. File arrival is processed at block 424, stage data computed at step 426, universe creation (i.e., the universe of VINs subject to the recall with appended data) at step 428, flags are added as previously described at step 430, and campaign extracts are built at step 432. Campaign extracts 432 are formed into outgoing data sources 404, which include emails 434, direct mail 436, online distribution (via cookie match, for example) 438, premium partner distribution 440, call center (telephone calls and robocalls) 442, and dealer manifest data 444. Reporting extracts are also created at step 422, which include reports 402 of various types. Specifically, the reports may be to the enterprise data warehouse (EDW) dashboard 406, internal reporting for the system at 408, and monthly reporting to a governmental entity, such as NHTSA, at 410. Internal processing 446 is performed through various functions, including enhancement data 448, CDI processing 450, reverse phone append (RPA) processing 452, reverse email append (REA) processing 454, and wireless flagging (i.e., identifying a phone number as a cellular number) 456.

FIG. 3.6 shows a UI for campaign activation 460 that is displayed over a web-based service to the OEM. Campaign activation UI 460 features include: an internal web interface for outbound campaign setup; a parameter-driven configuration UI; business rule-based campaign curriculum assignment; capability of storing and processing event- (including time-) based triggers; storing library of campaigns for easy reuse; and support for direct mail, email, phone and online campaigns, as well as potentially additional channels such as in-vehicle voice messaging (IVVM) and dealer manifests. Specifically referring now to the fields of campaign activation UI 460, they include parameter name field 462; parameter description field 464; parameter entry check boxes 466; validation rules field 468; external files required checkboxes 470, file name field 472, and parameter purpose field 474. Each of these fields pertain to how the campaign process identifies the specific vehicle recall numbers (i.e., field action codes) to include in a particular outbound campaign. The campaign activation UI 460 walks the user through an input and validation process such that only the specific recall numbers that make up a particular recall are included in that campaign.

FIG. 3.7 provides a process flow for the utilization of the campaign activation UI 460 shown in FIG. 3.6. The UI allows for cross-channel campaign activation including: configuring and scheduling simple to medium complexity campaigns leveraging saved template & parameters; ingesting requirements for complex, new or ad hoc campaigns; creating campaign counts; reviewing and approving campaign audience selections; automating and streamlining quality control reporting and audits; and consistently and automatically building campaign history, apply controls and perform dealerization. Campaign requirements 480 are entered into the UI and the system intakes the requirements at step 484, the first of three steps in overall campaign management process 482. The user inputs the necessary data for campaign intake step 484 using the campaign activation UI 460 of FIG. 3.6. Also brought in at step 484 are saved (previous) campaigns 490, if relevant; information saved on the privacy-enabled data store 492; and custom campaign development parameters 494. The campaign is reviewed and approved by the OEM and/or the OEM advertising agency at step 486. Quality assurance (QA) and audit functionality is added at step 488. As previously noted, the output of the campaign is multi-channel contacts with the VIN owners, including direct mail 496, email 498, landline telephone contact 500, cellular phone contact 502, and in-vehicle communications (such as the General Motors OnStar service) 504.

The graphic of FIG. 3.8 illustrates the different types of campaigns the recall campaign UI 460 may process. It ranges from the simplest, "lights-out" campaigns 510 that are fully automated, to the more complex ones that require extensive scoping and testing with complex requirements. These include customizable campaigns with slight changes to existing campaigns 512, new campaigns with existing attributes that are template driven 514, to completely new campaigns 516. The recall campaign UI 460 in certain implementations is an important factor as to why the system is unique in terms of capabilities and functionalities in a solution that is very specific to the recall communications problem.

Turning to FIG. 4, the hardware components used to realize an implementation of the invention may now be described. File landing zone 112 and inner landing zone 114 are as described above with respect to FIG. 2.1. Data store 70, shown in FIG. 1.2, may be described here in further detail. In this implementation, the system uses a high-volume, NAS-based storage solution on a V7000 Unified Gen1 platform. It utilizes an LTO library backup solution with multiple scalable computing nodes supporting production and services; analytics, campaign, and development work; databases; and backups. In a particular configuration, it includes one or more terminal servers 600 with 32 cores and 128 GB of main memory; one or more database servers 602 with 8 cores and 65 GB of main memory; a test/development server 604 running Linux RHEL 6; and a SAS production server 606 with 16 cores and 32 GB of main memory. Communications are provided via a 16 Gb switched interconnected network. The V700 Gen 2 storage is configured for block-level encryption with 75 TB client space; 35 TB user space; 17 TB production space; and 7 TB archive space. Reporting environment 608 uses dual core virtual machines (VMs) for tableau desktop cluster 610 with 1 TB of space per client and also dual core VMs for tableau server cluster 612 with 1 TB of space per client.

A client-centric security model is used that isolates all client resources based on security groups within data store 70. The system uses CORP domain security mechanisms to control all resources and implements a single sign-on model for user access. All access is granted/revoked using CORP security groups associated with environment access, server access, and client resource access. Access to the network is controlled using FPE groups maintained by the system. Users must belong to the FPE group to gain connectivity to the system but also require specific group memberships to gain access to resources within the network. Thus all user access is role-based and supports the need-to-know security concept. There is an access control list maintained by the environment owner, which may be reviewed on a periodic basis, such as quarterly. Formal procedures are required to control the allocation of access rights to the system; for access to be granted to a server, there first must be an access request through Service Now. Once the request is received, the system approves access and the appropriate permissions to the user. Once that process is completed, a request is generated for a security administration team to provide access. Further assurance of security is provided through the use of audit logging to validate that the access controls are in place and working as intended. Data is encrypted at rest and in transit, and in an implementation the encryption is performed at the block level for performance reasons. No co-mingling of data is allowed within the system and no third party or external access is allowed.

Within reporting environment 608, all of the same security procedures are used as with data store 70 except for restrictions on third-party access. Because third-party or external access is allowed, all PII data accessible through reporting environment 608 is either removed or hashed. All data controls are enforcement on SAS datasets within reporting environment 608 as well as database data from data store 70.

It may be seen from the architecture as just described that the system is designed for both flexibility and performance. Because of this design, the system is expandable both in terms of storage and computing capacity based on resource demand. The system thus may accommodate any number of simultaneous recall tasks by expansion of storage and/or computing capacity. Furthermore, the system supports computing redundancy because all servers are capable of supporting all tasks that are performed by any other server; thus if a server fails, production processes can be supported on other servers without any physical change. In addition to computing redundancy, the use of the V7000 system allows for layers of redundancy that reduce the risk of downtime. Redundancies implemented in the system include redundant file modules, redundant NICS; RAID-based disks (i.e., disk drive arrays); spare disks; and spare drives. A recovery mechanism is further employed to allow for point-in-time restoration of files, both single-file restoration as well as full-volume restoration. All backups are performed through the LTO tape library.

Another advantage of the architecture as described is that it allows file systems to be shared between different operating systems using Corp Active Directory as the security/access control solution. Thus, for example, Linux and Windows servers can be integrated seamlessly and can be used in tandem to maximize each environment's strengths. Additionally, the production framework, which in this implementation is written using the Python programming language, is designed to detect and adapt the production processes automatically depending upon the platform the process is running on. Therefore, production processes can be moved seamlessly to any of the servers, whether using the Windows or Linux operating systems, and still execute successfully. The architecture of the system thus provides a high degree of fault tolerance while still allowing for the flexibility and expandability as previously described.

Using this architecture a number of recall campaigns 614 are distributed over a configurable distribution network 616 to provide, for example, email channel distribution through an email platform 618 from a provider 620 such as Acxiom Digital. Further, for example, campaign QA/audit functionality 622 may be provided through direct mail at step 624. Data "onboarding" (i.e., the provision of online data matched to offline data) may be provided at step 626 through services such as Adobe, Cobalt, or Acxiom AbiliTag using a provider such as LiveRamp at step 628.

The present invention has been described with reference to the foregoing specific implementations. These implementations are intended to be exemplary only, and not limiting to the full scope of the present invention. Many variations and modifications are possible in view of the above teachings. The invention is limited only as set forth in the appended claims. All references cited herein are hereby incorporated by reference to the extent not inconsistent with the disclosure herein. Unless explicitly stated otherwise, flows depicted herein do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims. Any disclosure of a range is intended to include a disclosure of all ranges within that range and all individual values within that range.

The invention claimed is:

1. An automobile recall system, comprising:
a production server configured to construct a parameter-driven configuration campaign activation user interface (UI) over a web-based service configured to identify specific vehicle recall numbers, wherein the campaign activation UI comprises a parameter name field configured to receive field action codes to identify specific vehicle recall numbers, and a parameter description field configured to receive a description of the field action codes;
a privacy-compliant data store in communication with the production server, wherein the data store comprises a plurality of scalable computing nodes collectively storing a plurality of records pertaining to automobile consumers, wherein each of the plurality of records comprises a consumer link, and wherein each of the plurality of records comprises no personally identifiable information (PII) for the customer to whom each of the plurality of records pertains, wherein the privacy-complaint data store comprises a data environment firewall and a security model configured to isolate client resources based on security groups within the data store wherein a user must belong to a security group to access resources within the data store;
an inbound data landing area in communication with the production server, comprising an inbound firewall, a file landing zone to receive an inbound file, and an inner security zone, wherein the inbound data landing area is configured to detect a landed file on the inner security zone and transfer the landed file across the inbound firewall to the inner security zone;
an outbound data landing area in communication with the production server, comprising an outbound firewall;
a vehicle-based data system comprising:
a manufacturer database in communication with the production server, wherein the manufacturer database comprises a plurality of records each pertaining to a particular vehicle sold by the manufacturer and comprising a vehicle identification number (VIN) field and a vehicle owner name field; and
a state registration database comprising registration data from either a state registration authority or an aggregator, wherein the state registration database is in communication with the production server, and wherein the state registration database comprises a plurality of records each pertaining to a particular vehicle and comprising a VIN field and a vehicle owner name field; and
a consumer-based data system comprising:
a marketing services provider server in communication with the production server;
an enhancement database in communication with the marketing services provider, wherein the enhancement database comprises a set of consumer records pertaining to a plurality of consumers in a geographic area where the automobile recall is effective;
wherein the production server is configured to apply customer data integration (CDI) links to both the records from the manufacturer database and the records from the state registration database; match records from the state registration database to consumer records from the enhancement database by comparing both a CDI link and the VIN from each of such records; combine vehicle-based data records from the manufacturer database and state registration database into a single data set, wherein the single set comprises a plurality of combined records each comprising a vehicle identification number (VIN) field and a current vehicle owner name field; apply to the single data set a list of VINs for vehicles subject to the recall to create a universal recall dataset comprising a record for each vehicle subject to the recall, the record for each vehicle subject to the recall identifying the current vehicle owner of such recalled vehicle; for each of the records in the universal recall dataset, enhance the data in such record with consumer-based data from the enhancement database through the marketing services provider to associate vehicle owner contact data with each such record; and store the enhanced universal recall dataset in the privacy-compliant data store.

2. The automobile recall system of claim 1, wherein the consumer records in the enhancement database comprises one or more of a name, an address, a telephone number, an email address, name change history information, address change history information, demographic data, or lifestyle data.

3. The automobile recall system of claim 2, wherein the production server is further operable to create a recall campaign comprising a plurality of communications to a vehicle owner through a plurality of communications channels.

4. The automobile recall system of claim 3, wherein the plurality of communications channels comprises two or more of direct mail, email, social content messaging, on-line advertisements, text messages, and addressable television content.

5. The automobile recall system of claim 4, wherein the production server is further configured to receive results of the recall campaign and dynamically adjust the communications channel used to contact the vehicle owner based on previous results in attempting to contact the vehicle owner.

6. The automobile recall system of claim 5, wherein each record in the data store comprises a parts ordered flag.

7. The automobile recall system of claim 6, wherein each record in the data store further comprises a parts shipped flag.

8. The automobile recall system of claim 7, wherein each record in the data store further comprises a repaired flag.

9. The automobile recall system of claim 1, further comprising a plurality of consumer electronic devices in communication with the marketing services provider over a network and configured to receive an electronic message pertaining to the vehicle recall.

10. The automobile recall system of claim 9, wherein the electronic message is one or more of an email, a web-based advertisement, social content, or an addressable television advertisement.

11. The automobile recall system of claim 1, wherein the production server is further configured to, when a match is found on both a CDI link and VIN between a consumer record from the enhancement database and record from the state registration database, flag the consumer record as a known record and discard the matched record from the state registration database.

12. The automobile recall system of claim 11, wherein the production server is further configured to, when a match is found on only a VIN but not a CDI link between a consumer record from the enhancement database and a record from the state database, flag the record from the state registration database as an unknown record and discard the consumer record from the enhancement database.

13. The automobile recall system of claim 12, wherein the production server is further configured to match the plurality of records from the manufacturer database each pertaining to a particular vehicle sold by the manufacturer and comprising a vehicle identification number (VIN) field and a vehicle owner name field against all records flagged as known or unknown, and return a set of matched recall records.

14. The automobile recall system of claim 13, wherein the production server is further configured to place all records from the manufacturer databases each pertaining to a particular vehicle sold by the manufacture that are not within the set of recall records into a watch list, and to rerun the records in the watch list to find a match between the recall records in the watch list and a vehicle owner name field against all records flagged as known or unknown on a periodic basis.

15. The automobile recall system of claim 14, wherein the production server is further configured to, for each record in the set of matched recall records, compare such records to at least one do not contact list, and remove from the set of matched recall records any such records for which a match is found in the at least one do not contact list.

16. The automobile recall system of claim 15, wherein the production server is further configured to execute a model score match routine against the set of matched recall records to segment the set of matched recall records based on owner demographic characteristics.

17. The automobile recall system of claim 16, wherein the production server is further configured to identify a channel for contacting an owner based upon the segment in which the matched recall record corresponding to the owner is segmented.

* * * * *